(12) United States Patent
Porter

(10) Patent No.: US 7,237,808 B2
(45) Date of Patent: Jul. 3, 2007

(54) TUBE AND PIPE FITTINGS

(75) Inventor: Arthur Porter, Meadowview, VA (US)

(73) Assignee: Tru-Fit Alignment Solutions, Inc., Meadowview, VA (US)

( * ) Notice: Subject to any disclaimer, the term of this patent is extended or adjusted under 35 U.S.C. 154(b) by 145 days.

(21) Appl. No.: 10/855,424

(22) Filed: May 28, 2004

(65) Prior Publication Data

US 2005/0264007 A1  Dec. 1, 2005

(51) Int. Cl.
*F16L 27/04* (2006.01)
(52) U.S. Cl. ............... 285/261; 285/145.3; 285/146.1
(58) Field of Classification Search ............ 285/261, 285/271, 145.3, 146.1, 146.3, 146.2
See application file for complete search history.

(56) References Cited

U.S. PATENT DOCUMENTS

| | | | |
|---|---|---|---|
| 1,528,967 A | | 3/1925 | Bersted |
| 2,175,191 A | | 10/1939 | Goyette |
| 2,388,633 A | * | 11/1945 | De Woody ............... 285/261 |
| 2,457,384 A | * | 12/1948 | Krenz ............... 285/261 |
| 2,506,096 A | * | 5/1950 | Marshall ............... 285/266 |
| 3,243,209 A | * | 3/1966 | Chertok ............... 285/261 |
| 3,475,039 A | * | 10/1969 | Ortloff ............... 285/45 |
| 4,618,173 A | * | 10/1986 | Dopyera et al. ............... 285/261 |
| 5,048,873 A | | 9/1991 | Allread et al. |
| 5,362,229 A | | 11/1994 | Yamaga |
| 5,391,014 A | | 2/1995 | Chen |
| 5,806,896 A | | 9/1998 | Sato et al. |
| 6,158,781 A | | 12/2000 | Aaron, III |

* cited by examiner

*Primary Examiner*—David Bochna
(74) *Attorney, Agent, or Firm*—Greenblum & Bernstein, P.L.C.

(57) ABSTRACT

Connector that includes a first element having a threaded portion and a rounded end, a second element having an end structured to slidably contact the rounded second end of the first element, and a third element having a conical bore. The second element extends through the conical bore for movement within the conical bore, and a threaded end structured and arranged to mate with the threaded portion of the first element. The instant abstract is neither intended to define the invention disclosed in this specification nor intended to limit the scope of the invention in any way.

8 Claims, 10 Drawing Sheets

37 DEGREE SINGLE

37 DEGREE DOUBLE

45 DEGREE SINGLE

45 DEGREE DOUBLE

TUBE AND PIPE FITTINGS

BACKGROUND OF THE INVENTION

1. Field of the Invention

The present invention relates to fittings for connecting tubes, pipes, and/or solid rods together. Moreover, when the tubes or pipes are utilized for transmitting fluids, e.g., liquids or gases, the fittings provide sufficient sealing to prevent leakage of the fluid.

2. Discussion of Background Information

Prior designs allow for one directional alignment at a point of contact between the fitting and the mating part. If it were necessary or desired to connect, via a tube, pipe, or rod, two objects having connector mounts that are offset from each other, i.e., not positioned in a straight line, some bending of the tube, pipe, or rod would be required in order to provide proper alignment for connecting the tube, pipe, or rod with the connector mounts. Thus, if not properly aligned, stress (tension) arises within the connected objects and/or parts, i.e., either a pushing or pulling force occurs between the objects and/or parts being connected.

Moreover, as engineering variances and tolerances make it impossible to produce two tubes, pipes, or rods that are exactly alike, such production is likewise impossible when producing large volumes of parts. Even with the standard tolerances given in the manufacturing process, stresses arise when connections are made. These variables can be exhibited as wall thickness variation, material hardness, diameter variation, and length of part variation, and can add to the amount of stress created in the connection. As the two parts being connected are most likely intended to be stationary, all flexibility in the area of the connection must come in the tube, pipe, or rod fittings.

U.S. Pat. No. 2,457,384 to Krenz shows a clamp for spherical joints in which a ball and socket joint is held in place by a clamping nut. As shown in FIG. 1, upper tube 5 can pivot relative to lower tube 7, and lower tube 7 includes a flange 9 to contact a flange 12 of cup 10. This arrangement, while allowing pivoting movement, does not provide support for the tubes in the region of the pivoting movement.

Further, U.S. Pat. No. 5,362,299 to Yamaga shows a piping connection device in which a ball and socket arrangement is provided between a gas inlet pipe and a gas outlet pipe. The ball and socket arrangement is clamped together by plates. As with the above-described patent to Krenz, the clamp of Yamaga does not provide support for the gas pipes in the pivoting region.

A pipeline ball and socket swiveling coupling is disclosed by Aaron, III in U.S. Pat. No. 6,158,781. In this patent, the ball structure is welded to the end of a pipe 11 to be clamped inside of a correspondingly shaped housing for pivoting. Once again, the housing of Aaron, III does not provide support for the pivoting pipe, which could result in the failure of the weld, and, therefore, the entire coupling.

Chen, in U.S. Pat. No. 5,391,014, shows a universally rotatable nipple for a brake cable. In this patent, a brake cable is guided through a first tube, a ball and socket coupling, and a second tube, such that, when the brake cable is pulled, pivoting between the first and second tubes occurs. It is noted that maintaining a seal or supporting the tubes is not a concern in Chen.

SUMMARY OF THE INVENTION

The present invention provides a fitting for coupling parts, e.g., pipes, tubes, or rods, that enables a defined pivoting range of movement of the parts relative.

In particular, the present invention allows for a defined range of directional alignments at point of contact between the fitting and the mating part, such that, even when two objects having mounting devices that are offset relative to each other, i.e., not in a straight line, need connection by parts, such as tubes, pipes, or rods, the present invention essentially eliminates any need for bending such parts, which bending can reduce structural integrity of the part, increase flow resistance in the bend region, and/or create stress in the connection.

According to the invention, the fittings of the instant invention can be utilized on one or both mounting devices of the objects to be connected by a tube, pipe, or rod and/or to interconnect tubes, pipes, or rods between the objects. In this manner, stress arising in and between the two objects being connected would not occur. Thus, the present invention allows for more tolerance between the two objects being connected.

Moreover, the present invention enables telescoping tube configurations between the objects being connected.

The present invention is directed to a connector that includes a first element having a threaded portion and a rounded end, a second element having an end structured to slidably contact the rounded second end of the first element, and a third element having a conical bore. The second element extends through the conical bore for movement within the conical bore, and a threaded end structured and arranged to mate with the threaded portion of the first element.

According to a feature of the invention, the end of the second element can have a flared end in which an inside of the flared end is structured to correspond to the rounded end of the first element. The third element may further include a rounded bore portion structured to correspond to an outside of the flared end. Further, the rounded bore portion can be coupled to the conical bore.

In accordance with another feature of the present invention, the conical bore may be structured to enable the second element to move at least 20° relative to an axis of the through hole.

Moreover, the first element can further have a through hole extending through the threaded portion and the rounded end, and the second element may include a tube or pipe structured to cover the through hole extending through the second end.

The present invention is directed to a process of forming a connector that includes placing a tube in a forming die, punching the end of the tube in the forming die to form a spherical flare, and positioning the spherical flare against a spherical element. The process also includes forming a conical bore in a coupling nut, placing the coupling nut over the spherical flare and the spherical element, pivoting the tube within the conical bore, and tightening a connection between the spherical element and the spherical flare.

In accordance with a feature of the instant invention, the spherical flare may be a double angle flare.

Further, a second tube can be slidably extendable into and through the spherical element and slidably extendible into and out of the tube, and the process can further include telescopically changing a length of the connected tube and second tube.

The instant invention is directed to a connector including a first element having a rounded portion, a second element having an end structured to slidably contact the rounded portion, and a third element having a conical bore. The second element extends through the conical bore for movement within the conical bore.

According to the invention, the connector can also include a fourth element having a rounded bore. The third element may further have a rounded bore, and the third and fourth elements can be couplable to each other to form a rounded cavity structured receive the rounded portion and to accommodate movement of the rounded portion within the rounded cavity. Further, the connector may include a tube structured to slidably extend into and through the first element and the fourth element. The fourth element can further include a conical bore structured to accommodate movement of the tube. The tube may be structured to be slidable into the second element.

According to another feature, the first element may have a through hole extending through the rounded portion, and the end of the second element can be structured to cover the through hole extending through the rounded portion.

The present invention is directed to a process for assembling a connector that includes forming a rounded end on a first element, forming a conical bore in a connector nut, sliding a second element through the conical bore, forming a flared end on the second element to slidably contact the rounded end, and coupling the connector nut to the first element.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
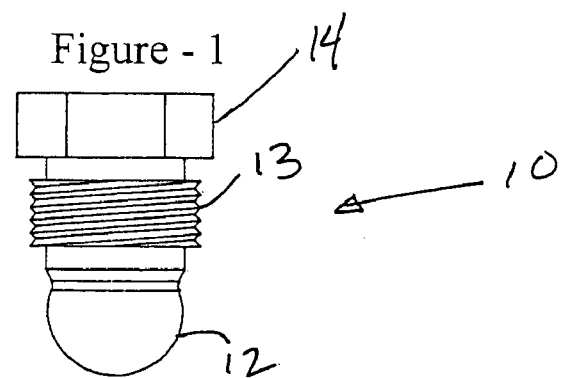
FIG. 1 illustrates shows a male plug fitting having a spherical end.

FIG. 1 shows a male plug fitting 10 having a spherical (circular) end 12. While FIG. 1 does not show a through hole extending through male plug fitting 10, such a design is contemplated and advantageous. Male plug fitting 10 also includes male threads 13 for connection to a coupling nut (not shown) and a female connection nut 14 for connection to a threaded connector located on an object to be connected.

Figure 2:
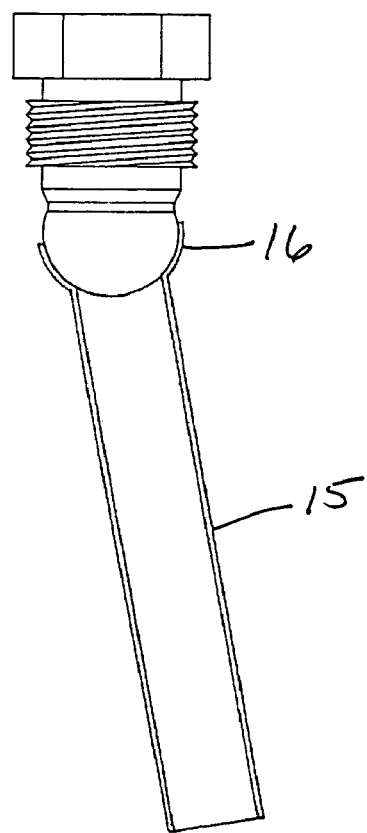
FIG. 2 illustrates a tube with a circular flare coupled to the spherical end of the male plug fitting depicted in FIG. 1.

FIG. 2 shows male plug fitting 10 depicted in FIG. 1 to be pivotably coupled to a tube or pipe 15. A flared end 16 of tube 15 is formed to slide over spherical end 12, whereby spherical end 12 pivots relative to male plug fitting 10. In this regard, flared end 16 can be rounded to correspond to the spherical shape of spherical end 12, or the flare can be of a more conventional design, i.e., to curve or spread outwardly from the tube body.

Figure 3:
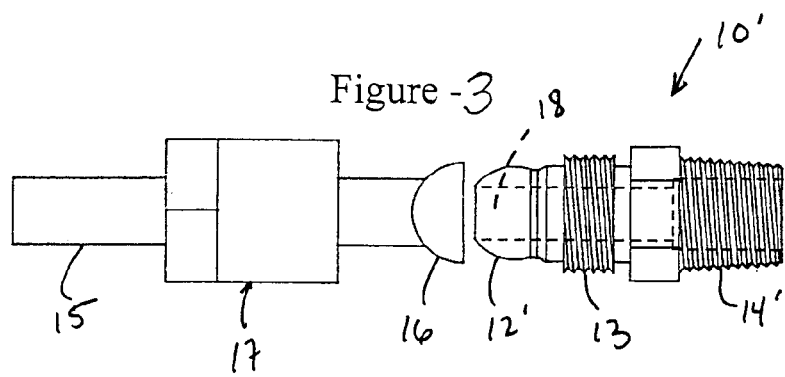
FIG. 3 illustrates a disconnection of the fitting in accordance with the invention.
Figure 4:
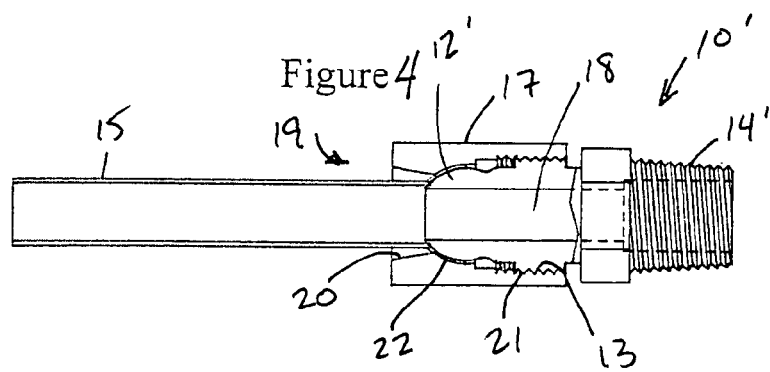
FIG. 4 illustrates a connection of the fitting in accordance with the invention.

FIGS. 3 and 4 illustrate a the fitting connections in a disassembled and assembled manner. In FIGS. 3 and 4, male plug fitting 10' is provided with a threaded male end 14' for connection to a female threaded connector located on an object to be connected. Further, in accordance with an advantageous feature of the invention, male plug fitting 10' includes a through hole 18 extending through spherical end 12' and threaded male end 14'. As shown, flared end 16 is positioned to rest on spherical end 12', and, once in place, coupling nut 17 slides along tube 15 and screws onto male threads 13. FIG. 4 shows a cutaway view of coupling nut 17, which includes a through hole 19 to allow coupling nut 17 to slide over tube 15 and female threads 21 arranged to engage male threads 13 to tighten the connection of tube 15 to male plug fitting 10'. Through hole 19 of coupling nut 17 is composed of a rounded section 22 and a conical section 20.

Figure 5:
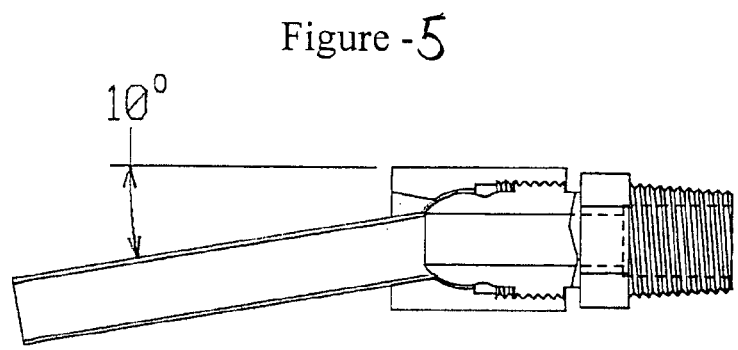
FIG. 5 illustrates a pivoting range of 10°.
Figure 6:
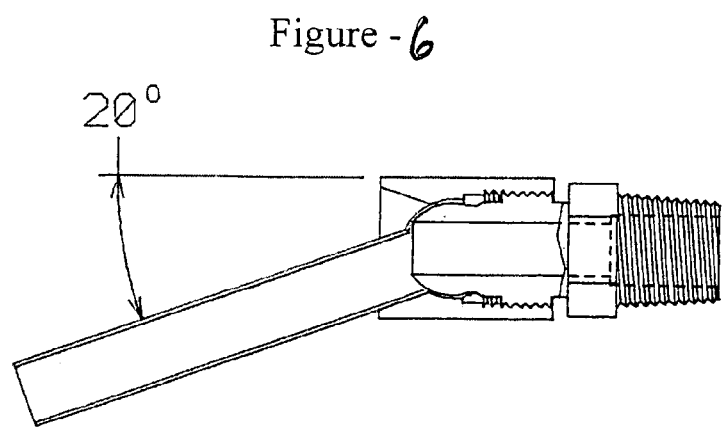
FIG. 6 illustrates a pivoting range of 20°.

As shown in FIGS. 5 and 6, the angle of the conical bore can be selected to enable a desired angular pivoting range for tube 15, e.g., 10° from a central axis of male plug fitting 10' or 20° from the central axis. Further, the conical bore serves to limit the pivoting range and to support the tube, pipe, or rod when it is pivoted to its outermost extent. Moreover, it is contemplated that, by machining the fittings and nuts with enough angle on the lead in taper of the conical bore, a pivot angle of up to 80° from the central axis is possible. It is noted that, as tube 15 pivots relative to male plug fitting 10', flared end 16 slides over the surface of spherical end 12', and, when coupling nut 17 is tightened, a suitable seal is maintained, e.g., for liquid or gas passing through tube 15 and male plug fitting 10'.

Figure 7:
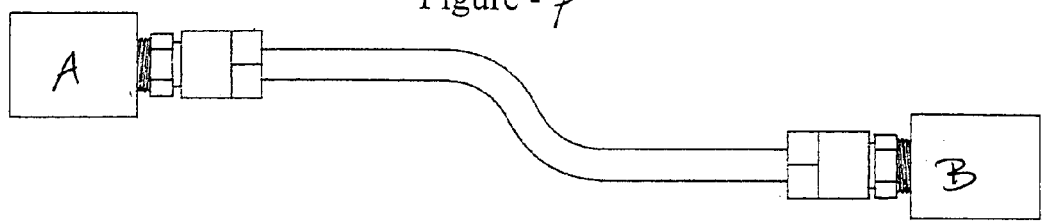
FIG. 7 illustrates a prior art connection of two objects with offset mounting devices.

As discussed above, situations often arise in which one desires to connect two objects, e.g., object A and B, that have mounting elements that are offset, i.e., not aligned, with each other. FIG. 7 shows a prior art design in which the tube is bent in order to couple the opposite ends of the tube to object A and B, respectively, in the manner necessary to achieve the straight-on connection necessary to connect the coupling bolt to the mounting fitting. While the tube is intended for some bending, in extreme cases the bend areas can become fatigued and susceptible to failure. Moreover, other situations may arise in which either the tube is too long or too short for the distance between the mounting elements of objects A and B, such that a pulling or pushing force may be induced on the two objects, and this stress will remain for the life of the connection.

Figure 8:
FIG. 8 illustrates two objects with offset mounting devices joined together in accordance with the invention.

In accordance with the instant invention, male plug fitting 10' can be connected to the mounting elements of objects A and B, as shown in FIG. 8. Further, while the mounting elements, and, therefore, male plug fittings 10' are offset from each other, because of the pivotability of the tube 15 relative to male plug fitting 10', due to the sliding engagement of flared end 16 over spherical end 12', coupling nut 17 can be cinched onto threads 13 to complete the connection of tube 15 to objects A and B even though tube 15 is not aligned with the central axis of male plug fitting 10'.

Figure 9:
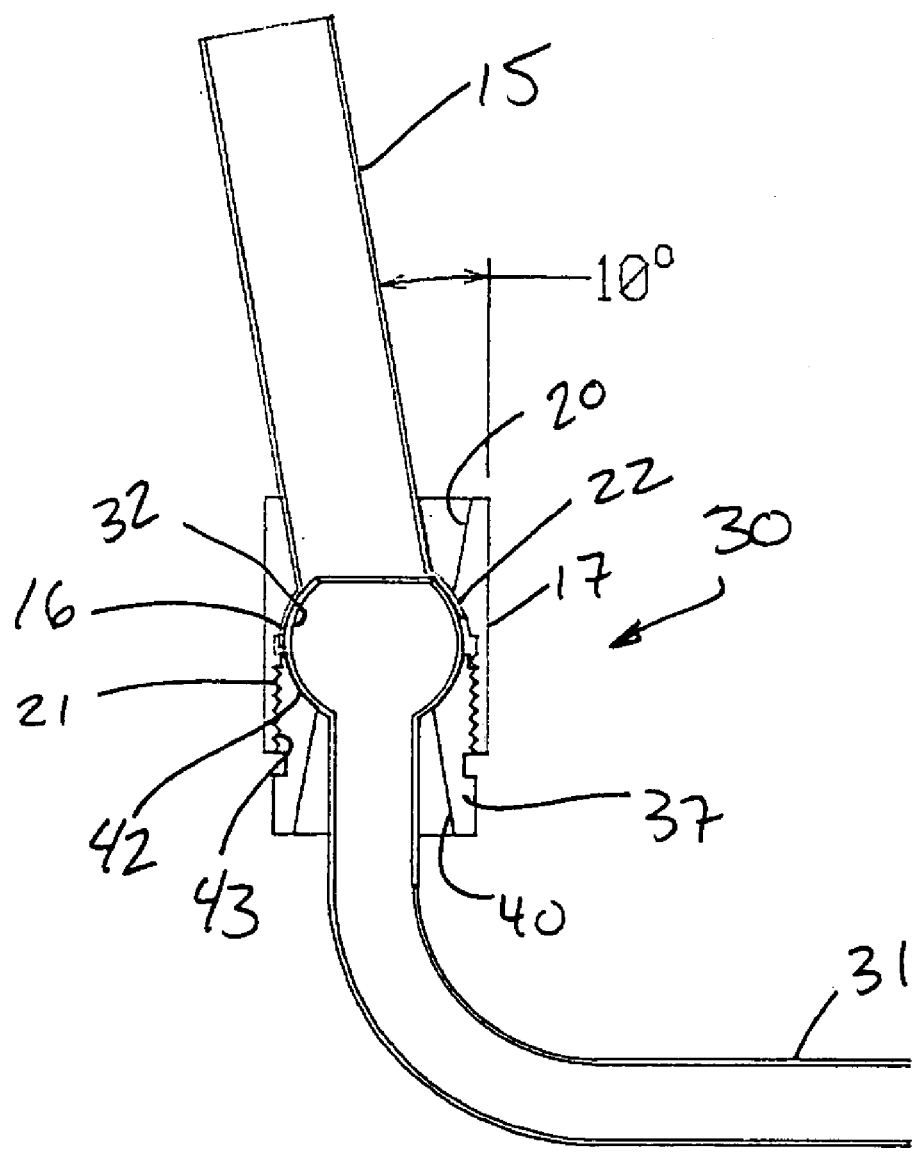
FIG. 9 illustrates a fitting for joining two tubes or pipes together in accordance with the invention.

As shown in FIG. 8, while the fitting of the instant invention provides an advantageous connection between offset mounting elements of objects A and B, it is noted that the length of tube 15 is matched to the necessary distance between the mounting elements of objects A and B. In the event that the distance is not easy to ascertain, or if it may even vary, the instant invention is also directed to a tube coupling. FIG. 9 shows an exemplary embodiment of tube coupling 30 to couple tube 15 to another tube, such as tube 31. Tube coupling 30 utilizes flared end 16 and coupling nut 17, as discussed above, in order to couple tube 15 to tube 31, which is provided with a spherical head 32 over which flared end 16 is slidably engaged. Moreover, a coupling nut 37 slides over tube 31 and includes a rounded section 42 shaped to accommodate spherical head 32 and a conical bore shaped to provide pivoting movement of coupling nut 37 relative to tube 31. Coupling nut 37 also includes male threads 43 which engage with female threads 21 of coupling nut 17. Thus, according to the invention, because tube 15 and tube 31 are both pivotable relative to tube coupling 30, the pivoting range of tube 15 relative to tube 31 through tube coupling 30 is greater than that available when male plug fitting 10' is coupled to object A or B.

Figure 11:
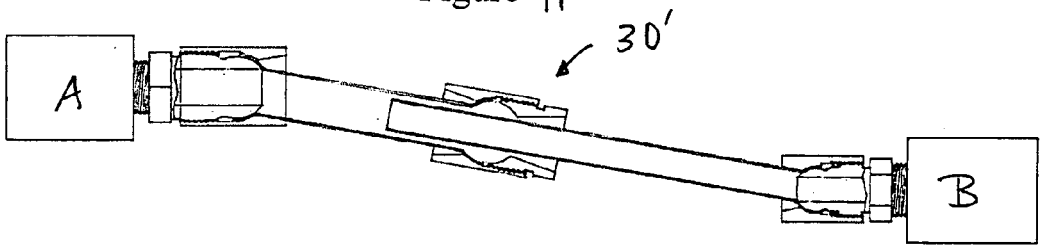
FIG. 11 illustrates joining together two objects having offset mounting devices and including a telescoping connector fitting having a ferule located between the tubes or pipes connecting the objects.
Figure 10:
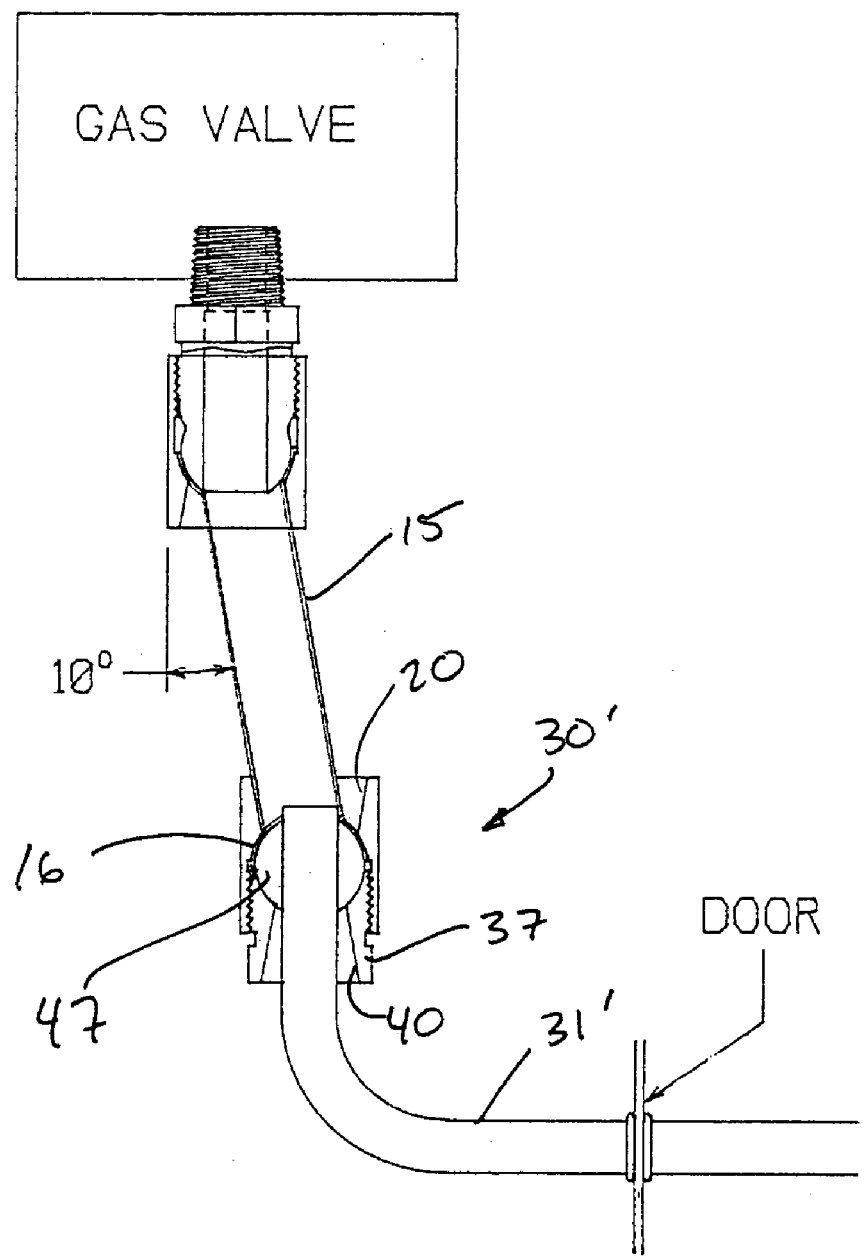
FIG. 10 illustrates joining together an object and supply pipe that are offset from each other in accordance with the invention.

In a further embodiment, as shown in FIG. 10, tube coupling 30' provides, not only pivoting of the tubes coupled to each its ends, as shown in FIG. 9, but also a telescoping feature. In this exemplary embodiment, a spherical element 47, such as a ferule, is positioned within the rounded sections of coupling nuts 17 and 37. Further, spherical element 47 includes a through hole 48, through which, a tube 31' having a straight (non-flared) end slidably extends. Tube 15 has an internal diameter larger than the outside diameter of tube 31', which allows a telescoping assembly of tube 31' into tube 15. Moreover, the end of tube 31' can slide within through hole 48, and, therefore, within tube 15 to adjust a length of the connected tubes. FIG. 11 shows an advantageous embodiment for telescoping tube coupling 31', in which the length of the tubes connecting objects A and B can be extended or shortened, as necessary, through the sliding adjustment of tube 31' through spherical element 47 in tube coupling 30'. After properly positioning the parts, coupling nuts 17 and 37 are tightened, whereby spherical element 47 tightens onto tube 31' and flared end 16 is tightened onto the surface of spherical element 47, resulting in a sealing connection that is rigid and leak proof.

Figure 12:
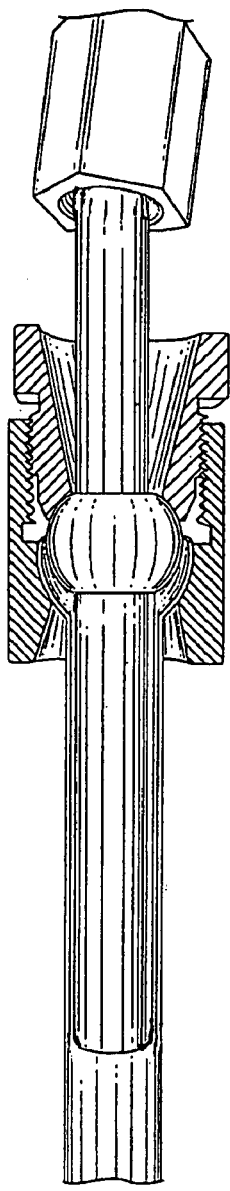
FIG. 12 illustrates a telescoping fitting having a ferule.
Figure 13:
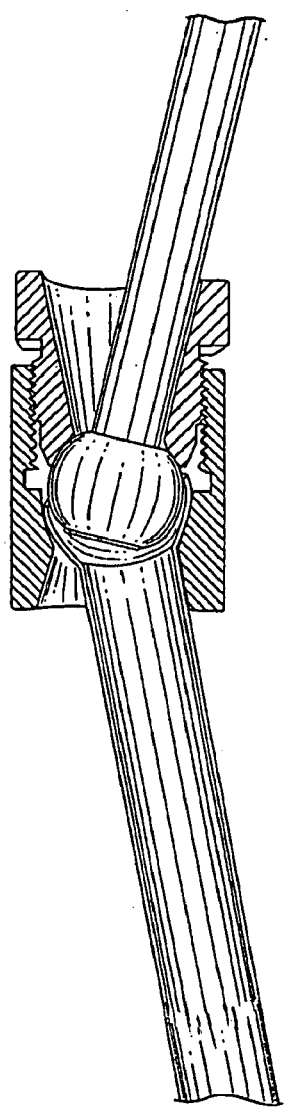
FIG. 13 illustrates pivoting of both parts connected in the telescoping fitting shown in FIG. 12.
Figure 15:
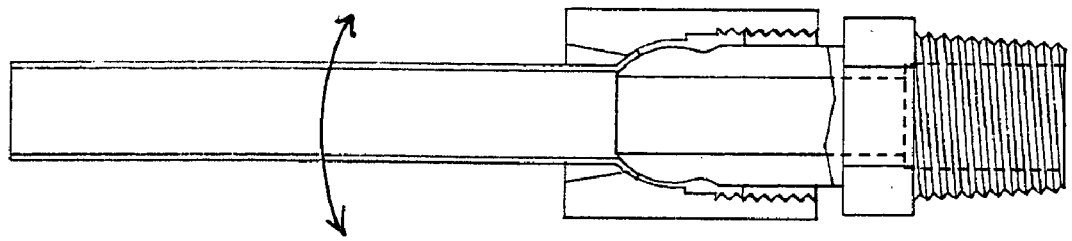
FIG. 15 illustrates a 37° single flare.
Figure 16:
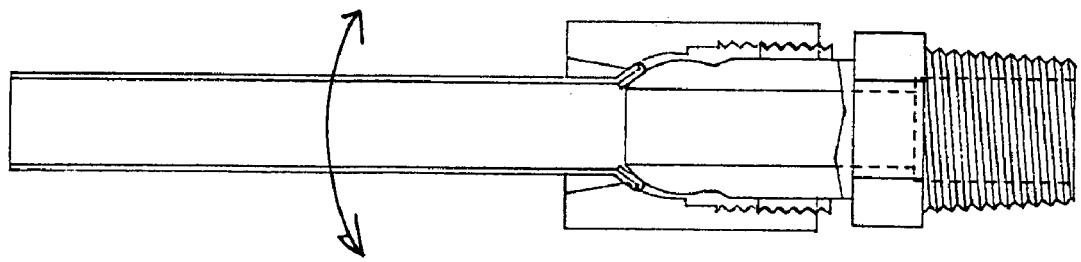
FIG. 16 illustrates a 37° double flare.
Figure 17:
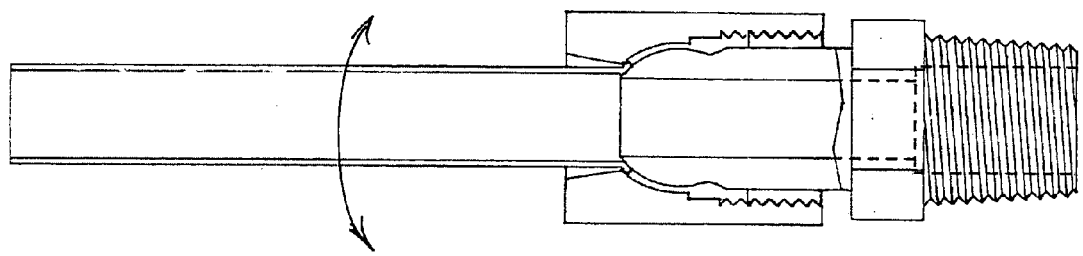
FIG. 17 illustrates a 45° single flare.
Figure 18:
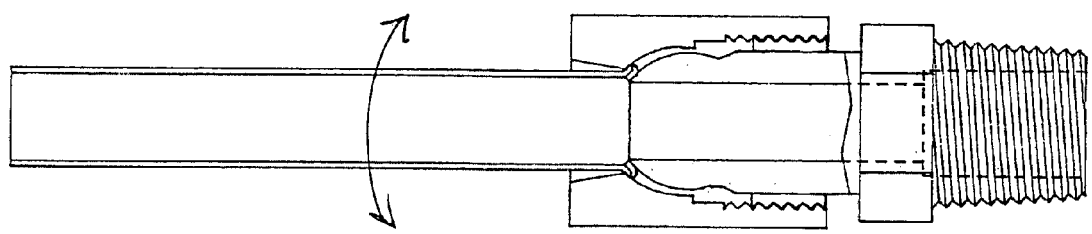
FIG. 18 illustrates a 45° double flare.

FIGS. 12 and 13 show a more detailed view of tube coupling 31 in which coupling nuts 17 and 37 are shown in cross-section. FIG. 12 shows the telescoping arrangement in which tube 31' extends through spherical element 47 and into tube 15. As tube 31' and tube 15 are coaxially arranged, tube 31' and tube 15 essentially cannot pivot relative to each other. However, as tube 31' is withdrawn from tube 15, such that its end is located in spherical element 37, tube 31' and tube 15 can be pivoted relative to each other at tube coupling 30'.

Figure 14:
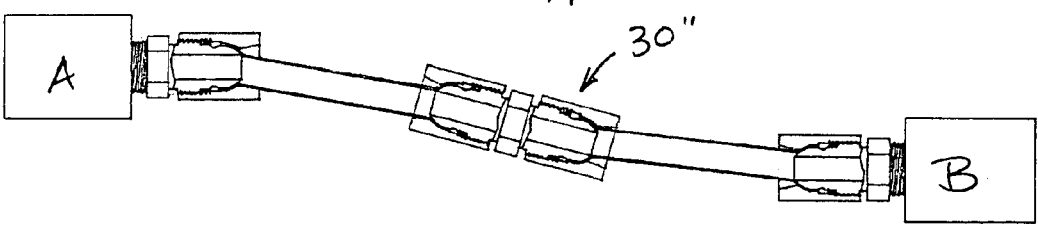
FIG. 14 illustrates joining together two objects having offset mounting devices and including a pivotable connector fitting between the tubes or pipes connecting the objects.

FIG. 14 illustrates a further embodiment of a tube coupling 30" formed essentially by two oppositely oriented male plug fittings 10". As with tube couplings 30 and 30' depicted in FIGS. 9–11, tube coupling 30" provides pivotability of the tubes at both of its ends so as to facilitate connecting objects A and B.

Figure 19:
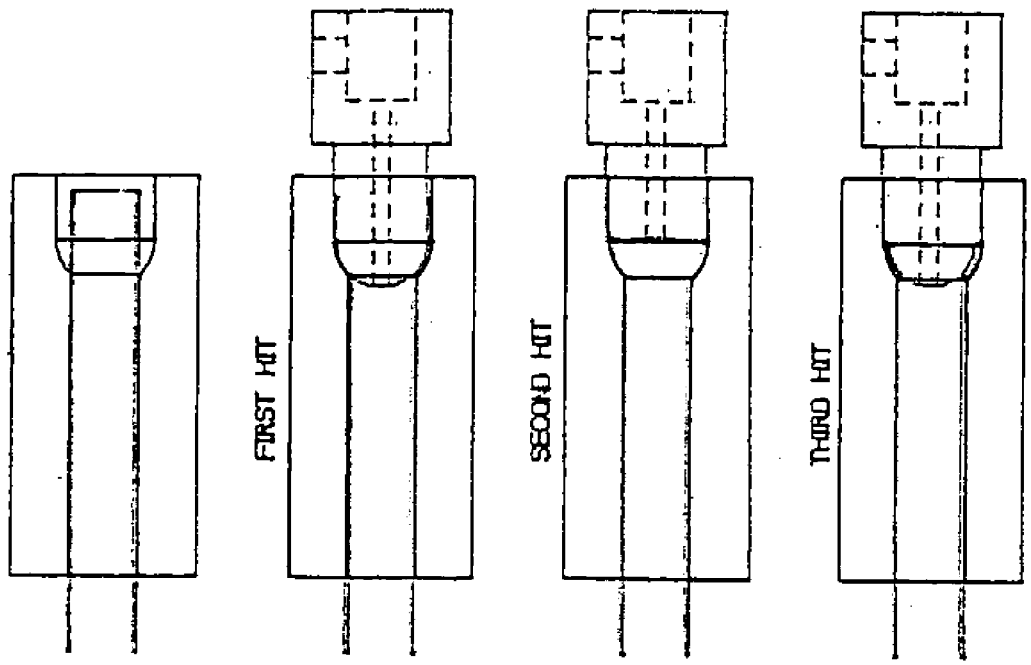
FIG. 19 illustrates the steps for forming a single and double flare.

Flared end 16 of tube 15 can be formed in accordance with standard SAE J533a to form single or double 37° flares or single or double 45° flares, as illustrated in FIGS. 15–18. An exemplary process for forming flared end 16 is shown in FIGS. 19a–19d. In FIG. 19a, tube 15 is inserted into a forming die. A hit operation is performed as a punch having a rounded end is used to expand the end of tube 15 in FIG. 19b. The flare angle is selected by the specific forming die and punch utilized. In the event only a single angle flare is desired, the above operation has successfully achieved this objective. However, if a double angle flare is sought, an essentially flat punch is provided in FIG. 19c to inwardly fold a portion of the expanded tube depicted in FIG. 19b. Next, a punch having a rounded end extending from a shoulder portion is inserted into the forming die in FIG. 19d to press down the folded portion from FIG. 19b in order to create a half moon socket (double flare). The created flare can be referred to as a spherical, circular, or socket type double flare. Further, this process is intended as exemplary and it is note that flares may be formed by other methods, such as hydro-forming and spinning.

Figure 20:
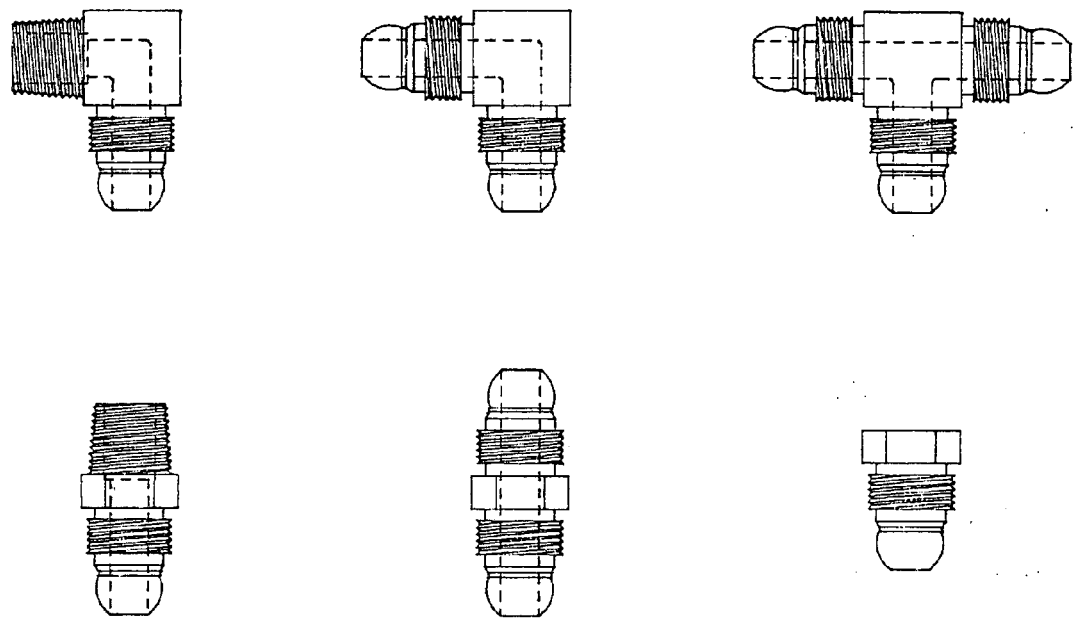
FIG. 20 illustrates a number of embodiments of male members utilized in accordance with the invention.
Figure 21:
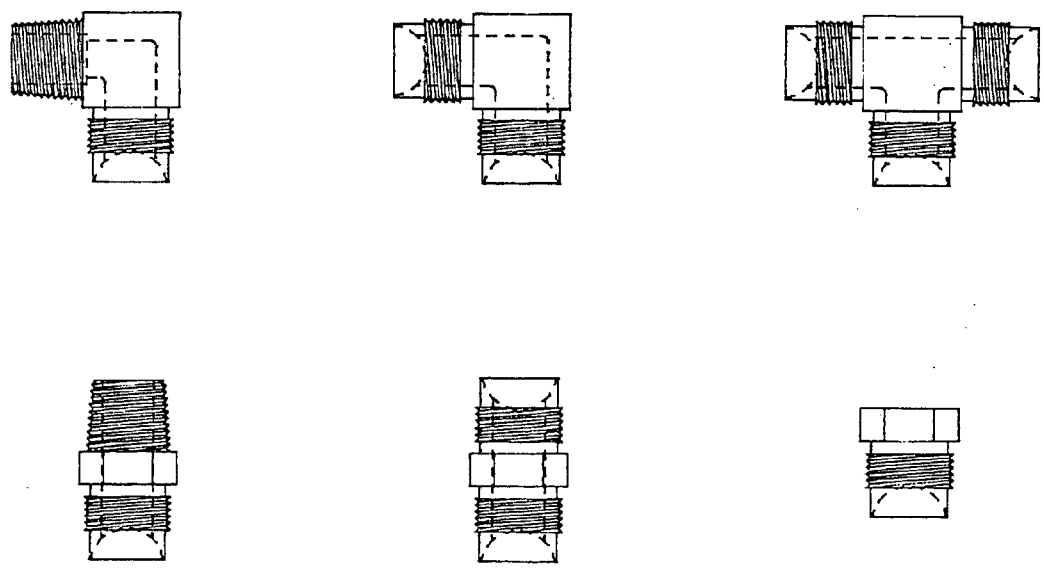
FIG. 21 illustrates a number of embodiments of female members utilized in accordance with claim invention.

FIG. 20 shows various embodiments of male plug fittings in accordance with the features of the instant invention and FIG. 21 shows various embodiments of female fittings in accordance with the invention. With regard to the female fittings, it is noted that the end of the tube connected to the female fitting would be spherical, such as shown in FIG. 9, instead of flared. It is further noted that, while a number of embodiments for male plug fittings and female fittings are shown in FIGS. 20 and 21, this listing is merely representative and is not be considered as limited.

While not intended to be in any manner limiting, it is noted that tubes utilized in accordance with the instant invention can be, e.g., metals (both ferrous and non ferrous), resin materials, plastics, pvc, and cpvc. Moreover, in accordance with the features of the invention, the fitting can be formed by forging, casting, extruding, and molding. Still further, additional processes, such as machining, can be operated on the fitting to render it in compliance with the features of the invention.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A connector comprising:
   a first element having a threaded portion and a rounded end;
   a second element having an end structured to slidably contact said rounded end of said first element;
   a third element having a conical bore, through which said second element extends for movement within said conical bore, a threaded end structured and arranged to mate with said threaded portion of said first element, and a rounded bore portion structured to correspond to an outside of the structured end of the second element.

2. The connector in accordance with claim 1, wherein said end of said second element has a flared end in which an inside of said flared end is structured to correspond to said rounded end of said first element.

3. The connector in accordance with claim 1, wherein said rounded bore portion is coupled to said conical bore.

4. The connector in accordance with claim 1, wherein said conical bore is structured to enable said second element to move at least 20° relative to an axis of said through hole.

5. The connector in accordance with claim 1, wherein said first element further has a through hole extending through said threaded portion and said rounded end, and said second element comprises a tube or pipe structured to cover said through hole extending through said second end.

6. A connector comprising:
   a first element having a rounded portion;
   a second element having an end structured to slidably contact said rounded portion;
   a third element having a conical bore, wherein said second element extends through said conical bore for movement within said conical bore, and further having a rounded bore;
   a fourth element having a rounded bore, wherein said third and fourth elements are couplable to each other to form a rounded cavity structured receive said rounded portion and to accommodate movement of said rounded portion within said rounded cavity; and
   a tube structured to slidably extend into and through said first element and said fourth element.

7. The connector in accordance with clam 6, wherein said fourth element further includes a conical bore structured to accommodate movement of said tube.

8. The connector in accordance with claim 7, wherein said tube is structured to be slidable into said second element.

* * * * *